United States Patent
Roberts et al.

(10) Patent No.: US 9,931,702 B2
(45) Date of Patent: Apr. 3, 2018

(54) LOCKING DRILL BUSHING

(71) Applicant: The Boeing Company, Chicago, IL (US)

(72) Inventors: Matthew K. Roberts, Everett, WA (US); Brent F. Craig, Everett, WA (US); Aurelio C. Isidro, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/254,418

(22) Filed: Sep. 1, 2016

(65) Prior Publication Data

US 2018/0056402 A1    Mar. 1, 2018

(51) Int. Cl.
    *B23B 49/02*    (2006.01)

(52) U.S. Cl.
    CPC ............ *B23B 49/02* (2013.01); *B23B 49/023* (2013.01); *B23B 2215/04* (2013.01); *B23B 2247/12* (2013.01); *B23B 2260/004* (2013.01); *B23B 2260/088* (2013.01); *B23B 2270/20* (2013.01)

(58) Field of Classification Search
    CPC ..... B23B 49/02; B23B 49/023; B23B 49/008; B23B 2270/20
    See application file for complete search history.

(56) References Cited

U.S. PATENT DOCUMENTS

| | | | | | |
|---|---|---|---|---|---|
| 2,462,386 | A | * | 2/1949 | Griffin | B23B 31/02 408/115 R |
| 2,839,953 | A | * | 6/1958 | Hanger | B23B 49/00 279/51 |
| 2,868,044 | A | * | 1/1959 | Robinson | B23B 49/008 408/110 |
| 2,935,905 | A | * | 5/1960 | Winslow | B23B 45/04 408/112 |
| 3,024,673 | A | * | 3/1962 | Schneider | B23B 49/006 408/112 |
| 5,161,923 | A | * | 11/1992 | Reccius | B23B 49/02 408/103 |
| 5,395,187 | A | * | 3/1995 | Slesinski | B23B 49/02 408/1 R |

(Continued)

OTHER PUBLICATIONS

CarrLane USA Catalog, Part No. A-16522, www.carrlane.com.

*Primary Examiner* — Daniel Howell
(74) *Attorney, Agent, or Firm* — Duft Bornsen & Fettig LLP (57) ABSTRACT

A drill bushing for a drill unit. In one embodiment, the drill bushing includes a base member having an upper surface, a lower surface configured to rest on a workpiece having a pilot hole, and a retaining member that projects from the lower surface of the base member. The retaining member has a cylindrical outer diameter that fits within the pilot hole. The drill bushing further includes a drill hole that passes from the upper surface of the base member through the retaining member to provide a passage for a drill bit. The drill bushing further includes an expandable slit that passes through the base member and the retaining member to the drill hole, and an adjustment member configured to expand the expandable slit to increase the cylindrical outer diameter of the retaining member within the pilot hole.

20 Claims, 5 Drawing Sheets

(56) References Cited

U.S. PATENT DOCUMENTS

| | | | | |
|---|---|---|---|---|
| 5,482,411 A * | 1/1996 | McGlasson | ............. | B23B 47/28 |
| | | | | 408/1 R |
| 5,628,592 A * | 5/1997 | Ringer | .................... | B23B 49/02 |
| | | | | 408/110 |
| 6,012,877 A * | 1/2000 | McCowin | ............... | B23B 49/02 |
| | | | | 279/2.04 |
| RE38,684 E * | 1/2005 | Cesarone | ........... | A61B 17/1728 |
| | | | | 606/915 |
| 9,308,588 B2 * | 4/2016 | Ihara | .................... | B23B 49/023 |
| 9,517,513 B2 * | 12/2016 | Saito | ....................... | B23B 47/28 |

* cited by examiner

LOCKING DRILL BUSHING

FIELD

This disclosure relates to the field of tooling, and more particularly, to a drill bushing or similar apparatus.

BACKGROUND

The fabrication of objects, such as aircraft, sometimes requires drilling holes into a workpiece, such as a sheet of metal, a sheet of composite material, etc. To facilitate the drilling of holes, an apparatus known as a drill bushing is used to guide, position, and support a drill unit during drilling operations. A typical drill bushing includes a body of hardened metal, with a drill hole through the center of the body. The drill bit passes through the drill hole to form a corresponding hole in the workpiece. Therefore, drill holes can be precisely formed into the workpiece.

SUMMARY

Embodiments described herein include a drill bushing that is able to lock onto a pilot hole of one workpiece so that a drill unit is able to transfer the pilot hole through to another workpiece. Sometimes in fabrication, a workpiece may have a plurality of pre-drilled pilot holes. When this workpiece is stacked or laid upon another workpiece, an operator may want to transfer the pre-drilled pilot holes through to the bottom workpiece. The drill bushing as described herein includes a retaining member that is able to grip a pilot hole, and hold the drill bushing in place while a drill unit transfers the pilot hole to the bottom workpiece. The drill bushing may then release from the pilot hole, and an operator can move to another pilot hole for a similar process. The drill bushing as described herein advantageously allows for precise transfer of pilot holes between the workpieces.

One embodiment comprises a drill bushing comprising a base member having an upper surface, a lower surface configured to rest on a workpiece having a pilot hole, and a retaining member that projects from the lower surface of the base member. The retaining member has a cylindrical outer diameter that fits within the pilot hole. The drill bushing further includes a drill hole that passes from the upper surface of the base member through the retaining member to provide a passage for a drill bit. The drill bushing further includes an expandable slit that passes through the base member and the retaining member to the drill hole, and an adjustment member configured to expand the expandable slit to increase the cylindrical outer diameter of the retaining member within the pilot hole.

In another embodiment, a cylindrical outer surface of the retaining member contacts a wall of the pilot hole when the adjustment member expands the expandable slit.

In another embodiment, the retaining member includes at least one surface feature that radially protrudes from the cylindrical outer surface of the retaining member.

In another embodiment, a length of the retaining member protruding from the lower surface of the base member is less than a thickness of the workpiece.

In another embodiment, the expandable slit defines opposing surfaces in the base member with a gap separating the opposing surfaces. The adjustment member includes a threaded hole that passes from a side wall of the base member to a first one of the opposing surfaces, and a threaded rod that threads into the threaded hole and has a first end that extends through the gap and contacts a second one of the opposing surfaces to expand the expandable slit.

In another embodiment, the threaded rod further includes a handle on a second end that is distal from the first end, where the handle is configured to be grasped by a human operator.

In another embodiment, the drill bushing further includes an attachment member on the upper surface of the base member to attach the base member to a drill unit.

In another embodiment, the attachment member includes at least one screw that attaches the base member to the drill unit.

Another embodiment comprises a drill assembly that includes a drill bushing. The drill bushing includes a base member having an upper surface, a lower surface, and an annular retaining member that projects from the lower surface. The drill bushing further includes a drill hole that passes from the upper surface of the base member through the annular retaining member. The drill bushing further includes an expandable slit in the base member that extends from a side wall of the base member and through to the drill hole, and an adjustment member configured to expand the expandable slit to increase an outer diameter of the annular retaining member.

In another embodiment, the annular retaining member is configured to be inserted into a pilot hole of a workpiece while the lower surface of the base member rests on a top surface of the workpiece. An outer surface of the annular retaining member contacts a wall of the pilot hole when the adjustment member expands the expandable slit.

In another embodiment, the annular retaining member includes at least one annular rib that radially protrudes from the outer surface of the annular retaining member.

In another embodiment, a length of the annular retaining member protruding from the lower surface of the base member is less than a thickness of the workpiece.

In another embodiment, the expandable slit defines opposing surfaces in the base member with a gap separating the opposing surfaces. The adjustment member includes a threaded hole that passes from the side wall of the base member to a first one of the opposing surfaces, and a threaded rod that threads into the threaded hole and has a first end that extends through the gap and contacts a second one of the opposing surfaces to expand the expandable slit.

In another embodiment, the threaded rod further includes a handle on a second end that is distal from the first end, where the handle is configured to be grasped by a human operator.

In another embodiment, the handle includes a scale that indicates how far the handle has been turned.

In another embodiment, the drill bushing further includes an attachment member on the upper surface of the base member to attach the base member to a drill unit.

Another embodiment comprises a drill assembly that includes a drill unit and a drill bushing that attaches to an end of the drill unit. The drill bushing includes a base member having an upper surface, a lower surface configured to contact a workpiece having a pilot hole, and an annular retaining member that projects from the lower surface of the base member and fits within the pilot hole. The drill bushing further includes a drill hole that passes from the upper surface of the base member through the annular retaining member to provide a passage for a drill bit of the drill unit. The drill bushing further includes an attachment member on the upper surface of the base member to attach the base member to the drill unit. The drill bushing is split at a single point to form an expandable aperture that passes from the upper surface of the base member through the annular retaining member, and from the drill hole to a periphery of the base member. The drill bushing further includes an adjustment member configured to expand the expandable aperture to increase an outer diameter of the annular retaining member within the pilot hole.

In another embodiment, the annular retaining member includes at least one surface feature that radially protrudes from an outer surface of the annular retaining member.

In another embodiment, a length of the annular retaining member protruding from the lower surface of the base member is less than a thickness of the workpiece.

In another embodiment, the expandable aperture defines opposing surfaces in the base member with a gap separating the opposing surfaces. The adjustment member includes a threaded hole that passes from the periphery of the base member to a first one of the opposing surfaces, and a threaded rod that threads into the threaded hole and has a first end that extends through the gap and contacts a second one of the opposing surfaces to expand the expandable aperture.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
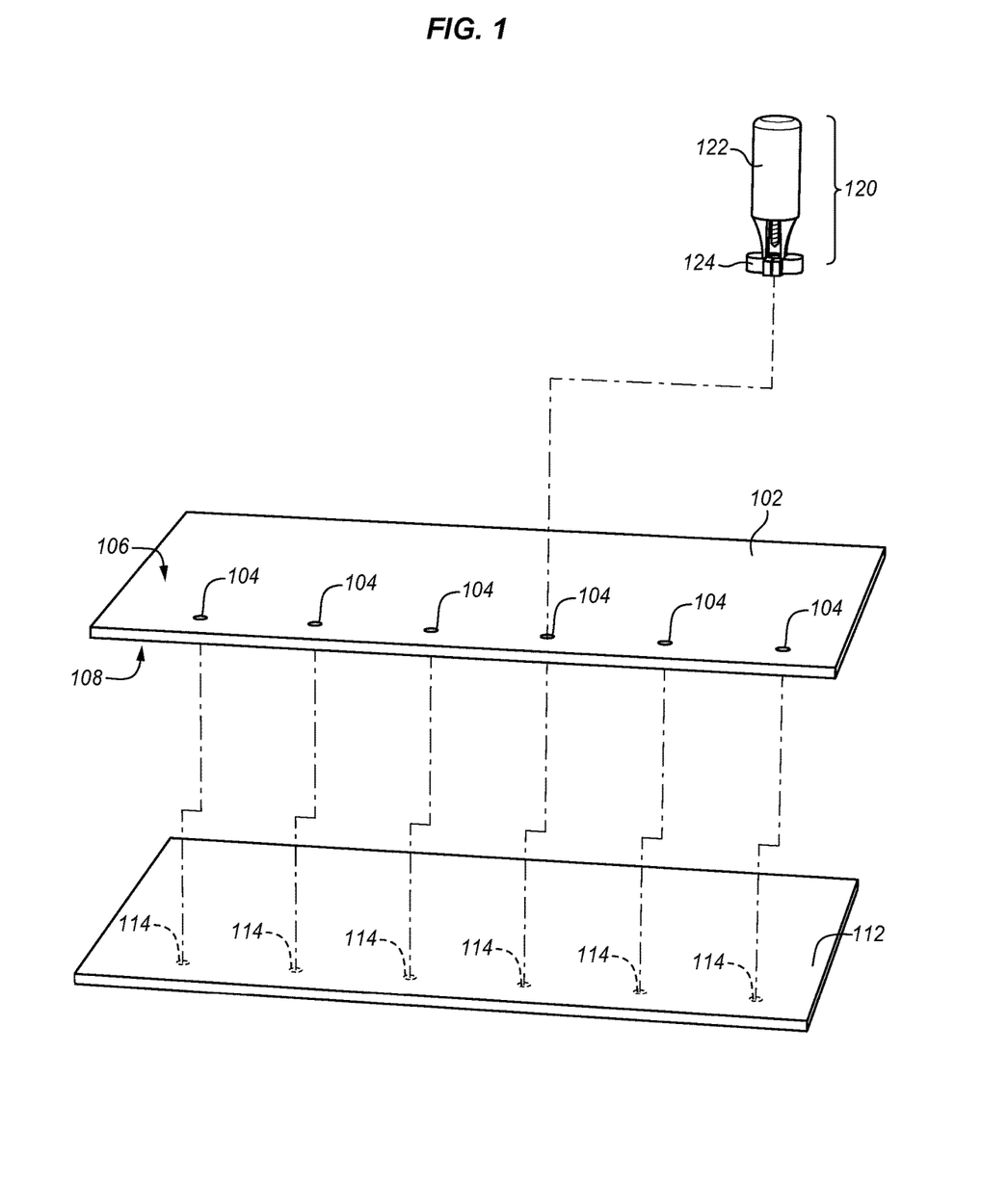
FIG. 1 illustrates an exemplary fabrication process where pilot holes from one workpiece are transferred to another workpiece.

FIG. 1 illustrates an exemplary fabrication process where pilot holes from one workpiece are transferred to another workpiece. Workpiece 102 includes a plurality of pilot holes 104 that extend from a top surface 106 through a bottom surface 108. Pilot holes 104 in workpiece 102 may be pre-drilled in another fabrication process, or may be pre-drilled from a supplier of workpiece 102. For this fabrication process, workpiece 102 is stacked or laid upon (partially or wholly) another workpiece 112, and pilot holes 104 in workpiece 102 are transferred to locations 114 on workpiece 112 that are previously undrilled. Workpiece 102 and/or workpiece 112 may be formed from metal materials, such as Titanium, Aluminum, etc., may be formed from composite materials, such as a Carbon Fiber Reinforced Polymer (CFRP), Carbon Fiber Reinforced Plastic (CRP), Carbon Fiber Reinforced Thermoplastic (CFRTP), etc., or may be formed from another type of material. Workpiece 102 and workpiece 112 may represent parts of an aircraft, an automobile, a watercraft, or some other machine being fabricated.

A drill assembly 120 is used in a drilling operation to transfer pilot holes 104 from workpiece 102 to workpiece 112. Drill assembly 120 includes a drill unit 122 and a drill bushing 124. Drill unit 122 may comprise an air drill, an electric drill, a power-feed drill, an orbital drill, or any other type of drill that is able to form a cylindrical hole in a workpiece. Drill bushing 124 is configured to attach to an end of drill unit 122, and to anchor drill assembly 120 to a workpiece (e.g., workpiece 102) during a drilling operation. Drill bushing 124 also guides a drill bit of drill unit 122 when transferring pilot holes 104 from workpiece 102 to workpiece 112.

Figure 2:
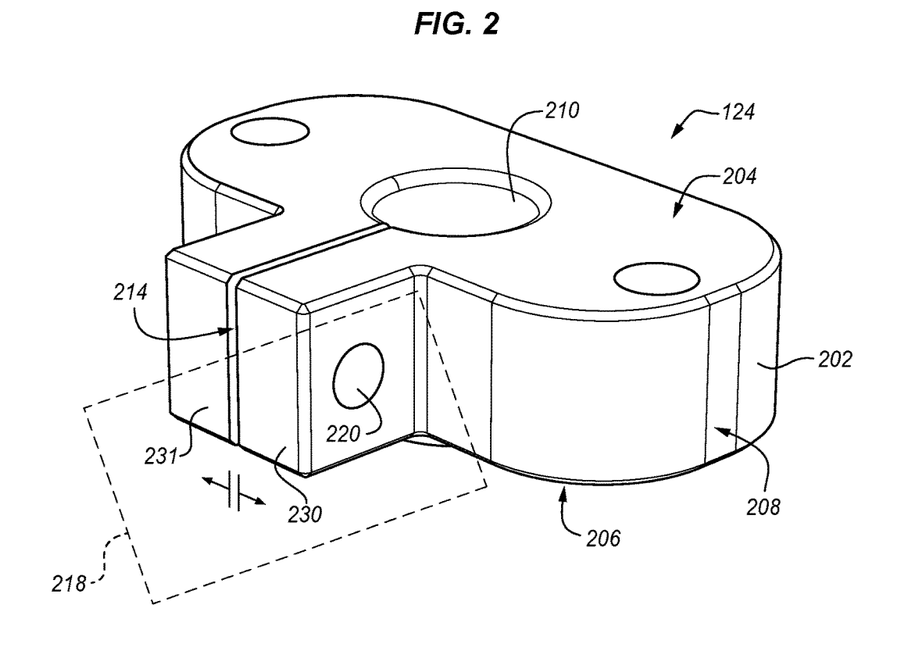
FIGS. 2-3 are isometric views illustrating a drill bushing in an exemplary embodiment.
Figure 3:
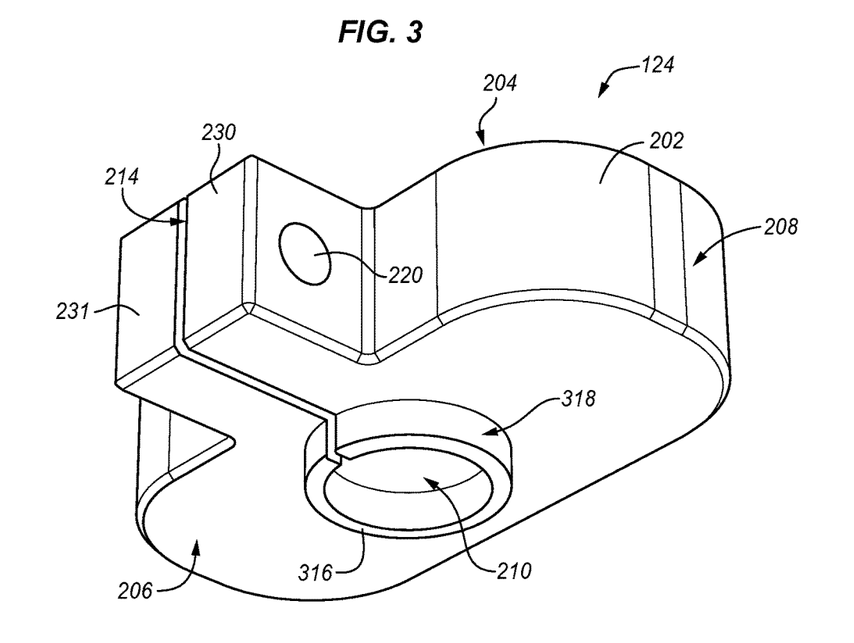

FIGS. 2-3 are isometric views illustrating drill bushing 124 in an exemplary embodiment. As a general overview, drill bushing 124 is split and is expandable across the split to lock onto a pilot hole. In this embodiment, drill bushing 124 comprises a unitary body of material, such as a hardened metal. Drill bushing 124 includes a base member 202 having an upper surface (or upper face) 204, and a lower surface (or lower face) 206 that opposes upper surface 204. Upper surface 204 represents the surface of drill bushing 124 that interfaces with a drill unit, such as drill unit 122 (see FIG. 1). Lower surface 206 represents the surface of drill bushing 124 that contacts or rests on a workpiece having one or more pilot holes (e.g., workpiece 102 in FIG. 1). Drill bushing 124 also includes an external side wall (or side surface) 208 that extends between upper surface 204 and lower surface 206. Side wall 208 defines the external shape, perimeter, or periphery, of base member 202. The external shape of base member 202 (when viewed from the top) has a rounded and elongated outline, with a pair of tabs 230-231 projecting from side wall 208 about the split portion of base member 202. The shape of side wall 208 as shown in FIGS. 2-3 is one example, and may vary as desired.

Drill bushing 124 also includes a drill hole 210 that passes through base member 202. Drill hole 210 is a cylindrical aperture that is open at both ends and extends from upper surface 204 through lower surface 206 of base member 202. Drill hole 210 is a passage through which a drill bit or drilling tool extends through drill bushing 124 (from upper surface 204 to lower surface 206) and is free to rotate. Drill hole 210 acts to guide the drill bit during a drilling operation.

Figure 4:
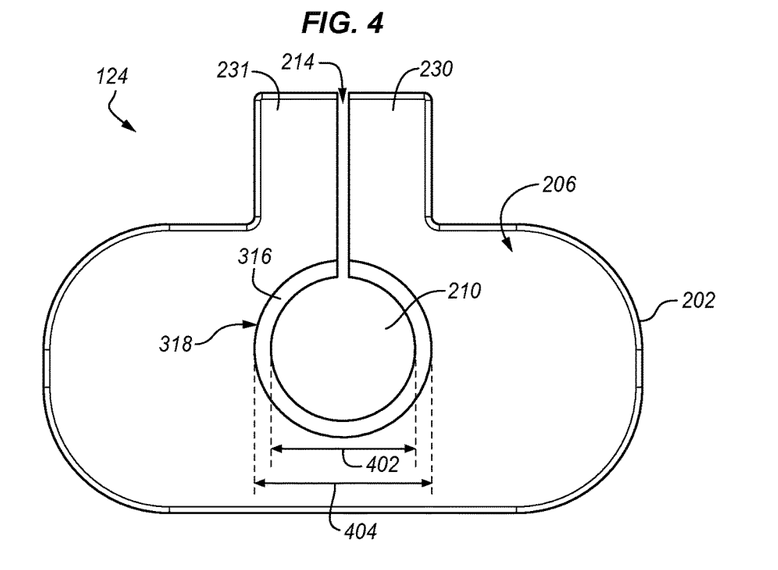
FIG. 4 illustrates a bottom view of a drill bushing in an exemplary embodiment.

As shown in FIG. 3, a retaining member 316 projects from lower surface 206 of base member 202 proximate to drill hole 210. Retaining member 316 is annular shaped, as drill hole 210 passes through the center of retaining member 316. Retaining member 316 is configured to be inserted within a pilot hole of a workpiece, and an outer surface 318 of retaining member 316 is configured to grip the wall of a pilot hole in the workpiece to prevent drill bushing 124 from working loose in a drilling operation. FIG. 4 illustrates a bottom view of drill bushing 124 in an exemplary embodiment. As shown in FIG. 4, outer surface 318 of retaining member 316 is cylindrical, and an outer diameter 404 of retaining member 316 is sized to fit within a pilot hole of a workpiece (e.g., pilot hole 104 of workpiece 102). An inner diameter 402 of retaining member 316 is at least as large as the diameter of drill hole 210. The wall thickness of retaining member 316 may vary as desired.

In this embodiment, base member 202 is split at a single point, such as between tabs 230-231, so that base member 202 (including retaining member 316) can be "opened". The split in base member 202 forms an expandable slot, groove, or slit 214 that passes through a portion of base member 202 (i.e., between tabs 230-231) and retaining member 316 to drill hole 210. Slit 214 is a cut or opening that extends from upper surface 204 to lower surface 206 of base member 202, and from side wall 208 of base member 202 through to drill hole 210. Because drill bushing 124 is a unitary body, slit 214 also forms a corresponding cut or opening through retaining member 316. Slit 214 is expandable so that base member 202 and retaining member 316 are able to be spread open to increase the outer diameter 404 of retaining member 316. When outer diameter 404 of retaining member 316 is increased, the outer surface 318 of retaining member 316 applies pressure against a wall of a pilot hole to grip the wall and prevent drill bushing 124 from working loose during a drilling operation.

Figure 5:
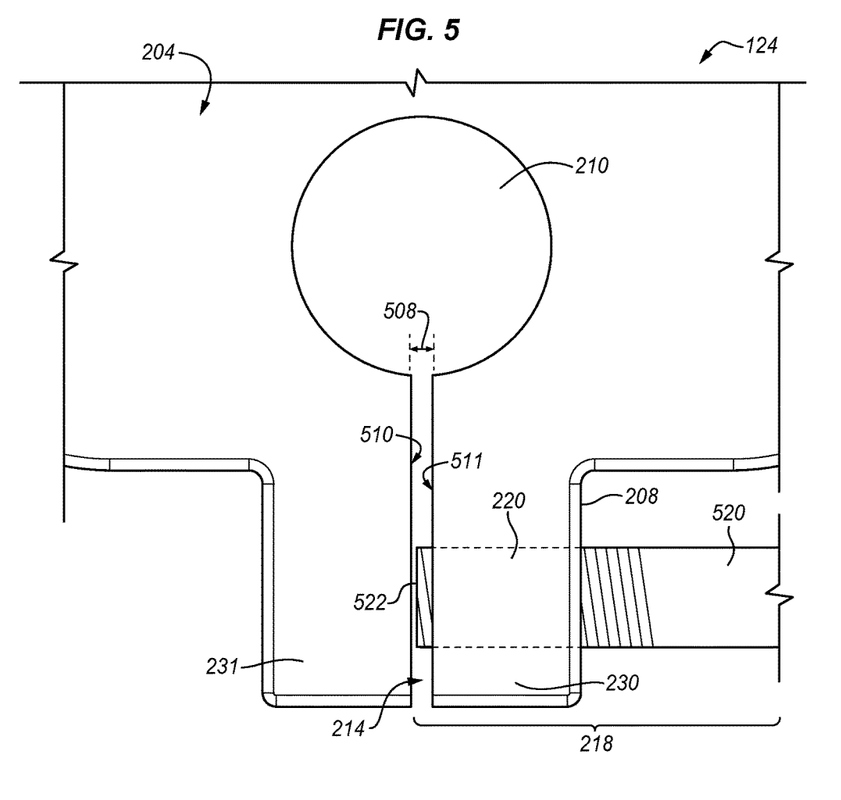
FIG. 5 is a magnified top view of a drill bushing in an exemplary embodiment.

To spread retaining member 316 about slit 214, drill bushing 124 further includes an adjustment member 218 (see FIG. 1). Adjustment member 218 as described herein comprises any mechanism that expands slit 214 to increase outer diameter 404 of retaining member 316, such as a threaded rod, a cam feature, a pneumatic actuator, or another type of mechanism that drives the diameter feature open. In one embodiment, adjustment member 218 includes a threaded hole 220 in base member 202 (see FIGS. 1-2), such as through tab 230 of base member 202. FIG. 5 is a magnified top view of drill bushing 124 in an exemplary embodiment. Slit 214 defines opposing surfaces 510-511 in base member 202 with a gap 508 separating the opposing surfaces 510-511. In this embodiment, threaded hole 220 passes from side wall 208 (i.e., at tab 230) of base member 202 through to opposing surface 511. Adjustment member 218 further includes a threaded rod 520 that threads into threaded hole 220. Threaded rod 520 has a first end 522 that extends through the gap 508 and contacts opposing surface 510. When threaded rod 520 is screwed into threaded hole 220, the first end 522 of threaded rod 520 applies a force against opposing surface 510 to expand slit 214 and increase gap 508 between opposing surfaces 510-511. This in turn increases outer diameter 404 of retaining member 316 (see FIG. 4) when it is inserted into a pilot hole.

Figure 6:
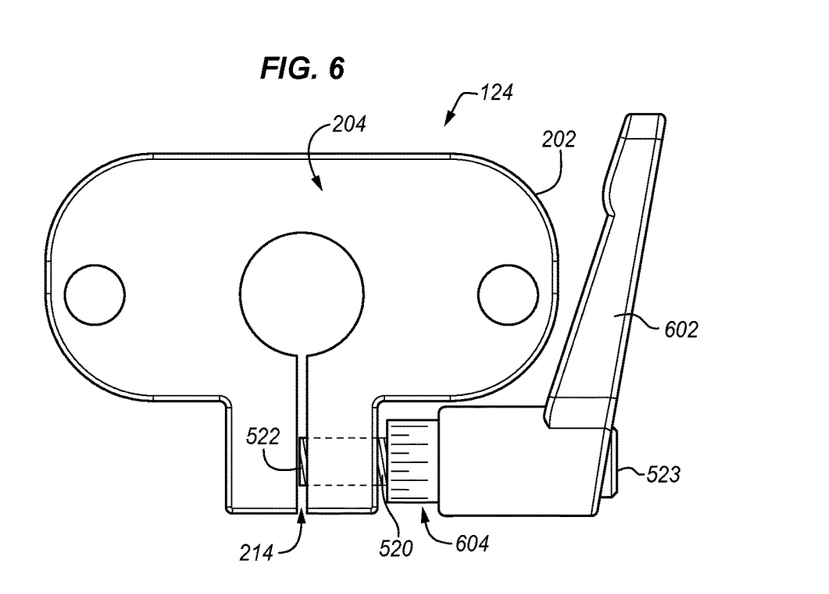
FIG. 6 is a top view of a drill bushing in an exemplary embodiment.

Threaded rod 520 may be driven by any desirable means, such as a human operator, a wrench, a screwdriver, etc. In one embodiment, a handle may be attached to a second end of threaded rod 520 to assist a human operator in quickly adjusting adjustment member 218. FIG. 6 is a top view of drill bushing 124 in an exemplary embodiment. In this embodiment, a handle 602 is affixed proximate to a second end 523 of threaded rod 520. The ergonomics of handle 602 is conducive to be grasped by a human operator. Handle 602 may include an index or scale 604 that indicates how far handle 602 has been turned. Therefore, an operator can repeat how much torque is applied to handle 602 for a plurality of pilot holes.

Figure 7:
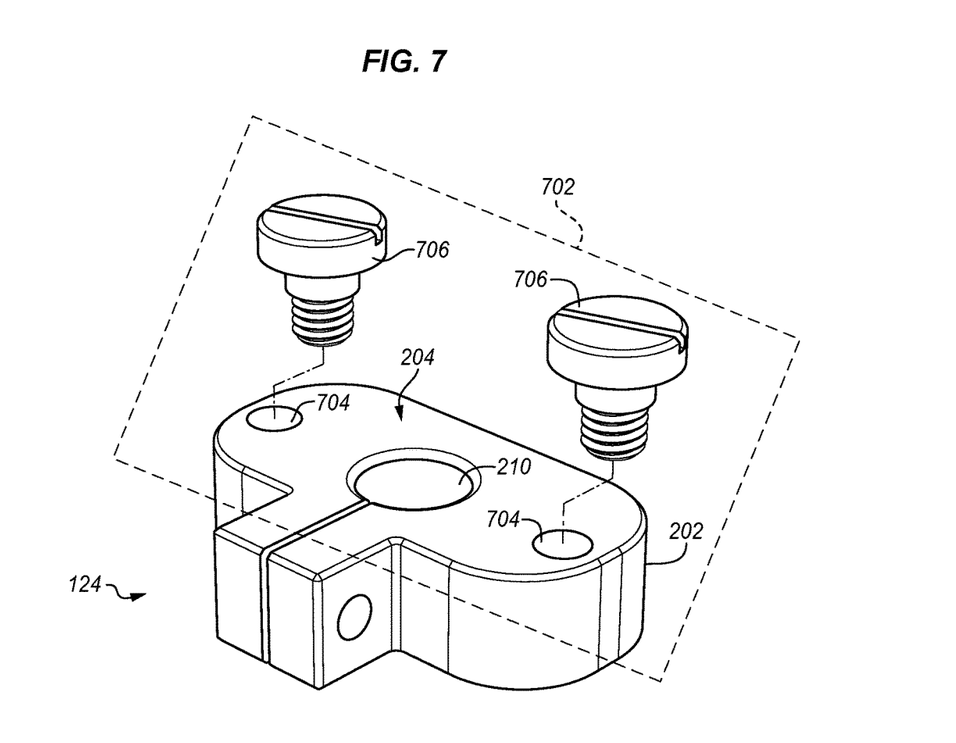
FIG. 7 is an isometric view of a drill bushing with an attachment member for attaching to a drill unit in an exemplary embodiment.

Drill bushing 124 may also include a mechanism for attaching drill bushing 124 to a drill unit, such as drill unit 122. FIG. 7 is an isometric view of drill bushing 124 with an attachment member for attaching to a drill unit in an exemplary embodiment. In this embodiment, drill bushing 124 further includes an attachment member 702, which includes one or more attachment holes 704 on upper surface 204 of base member 202 to attach base member 202 to a drill unit (not shown). Attachment member 702 further includes one or more screws 706 that are configured to screw into attachment holes 704. Attachment holes 704 may be threaded to receive screws 706.

Figure 8:
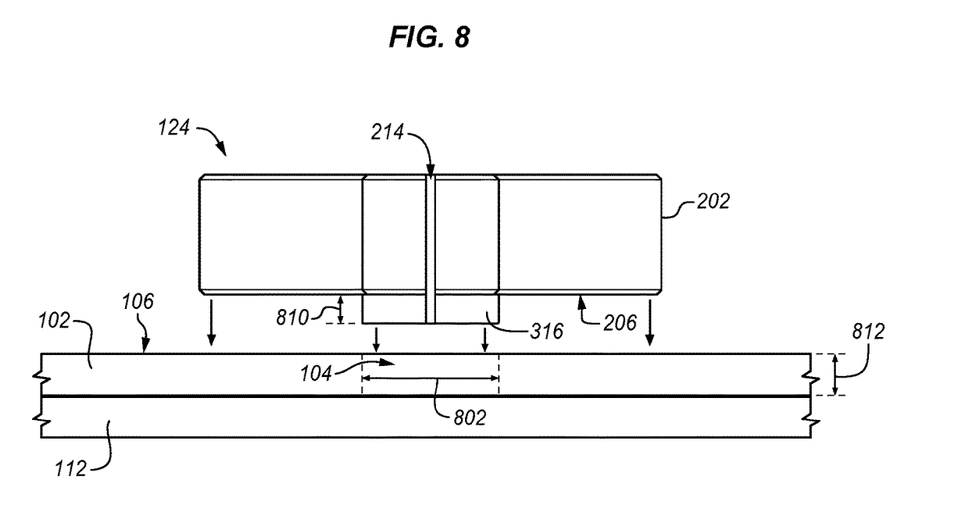
FIG. 8 is a side view of a drill bushing being anchored onto a workpiece in an exemplary embodiment.

FIG. 8 is a side view of drill bushing 124 being anchored onto workpiece 102 in an exemplary embodiment. As also shown in FIG. 1, workpiece 102 has a pilot hole 104 that is to be transferred to workpiece 112. Drill bushing 124 is placed on workpiece 102 so that lower surface 206 of drill bushing 124 rests on top surface 106 of workpiece 102, and retaining member 316 of drill bushing 124 is inserted into pilot hole 104. Pilot hole 104 is circular, and has a diameter 802. Outer diameter 404 of retaining member 316 (see FIG. 4) is less than the diameter 802 of pilot hole 104 so that retaining member 316 may be inserted into pilot hole 104. Also, the height 810 of retaining member 316 (i.e., the distance that retaining member 316 projects from lower surface 206 of base member 202) is less than a thickness 812 of workpiece 102. For example, if the thickness 812 of workpiece 102 is about 0.15 inches, then the height 810 of retaining member 316 is less than 0.15 inches.

Figure 9:
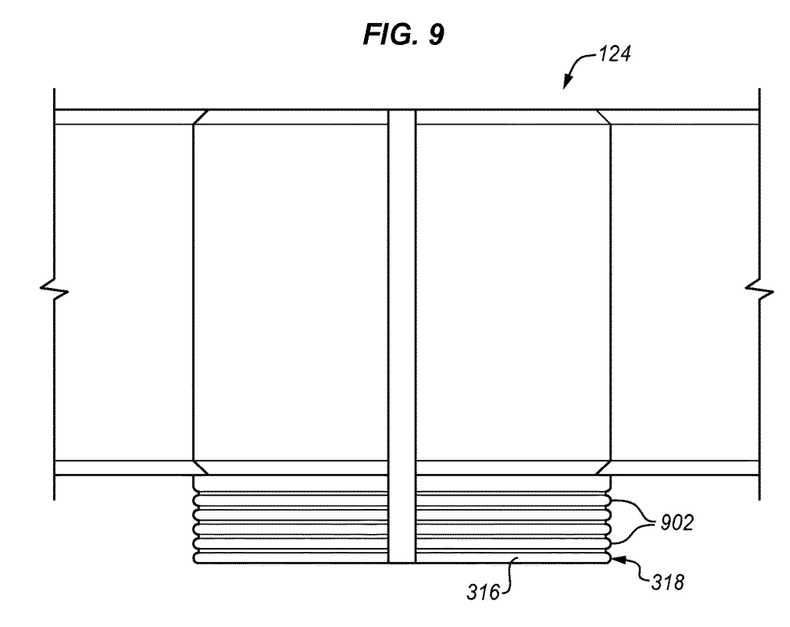
FIG. 9 is a magnified side view of a retaining member in an exemplary embodiment.

With retaining member 316 inserted into pilot hole 104, drill bushing 124 may be anchored to pilot hole 104 by an operator. The operator can utilize adjustment member 218 (see FIG. 5) to expand slit 214, which increases the size of outer diameter 404 of retaining member 316 and causes outer surface 318 of retaining member 316 to press against the wall of pilot hole 104. For example, the operator may turn handle 602 (see FIG. 6), which in turn causes the first end 522 of threaded rod 520 to apply a force against opposing surface 510 (see FIG. 5). This force opens gap 508, and causes the outer surface 318 of retaining member 316 to increase in diameter and contact the wall of pilot hole 104. The friction between outer surface 318 of retaining member 316 and the wall of pilot hole 104 provides grip to hold drill bushing 124 in place during a drilling operation. Outer surface 318 of retaining member 316 may be smooth, or may have surface features to increase the friction with workpiece 102. FIG. 9 is a magnified side view of retaining member 316 in an exemplary embodiment. In this embodiment, retaining member 316 includes one or more annular ribs 902 that radially protrude from outer surface 318 of retaining member 316. Ribs 902 act to grip workpiece 102 around pilot hole 104 to increase the amount of force needed to dislodge drill bushing 124 from pilot hole 104. Although ribs 902 are shown in FIG. 9, any surface features may be used in their place, such as ridges, serrations, bumps, knurling, teeth, etc., that protrude from outer surface 318.

Drill bushing 124 advantageously allows for accurate transfers of pilots holes from one workpiece to another blank workpiece, even if the workpieces are thin-walled. Assume, for example, that the workpiece having the pilot holes is about 0.15 inches thick, which provides very little surface area for a drill bushing to grab. Because retaining member 316 of drill bushing 124 is able to grab the wall of a pilot hole, drill bushing 124 is effectively held in place on the thin material during a drilling operation. Therefore, drill bushing 124 may be used in applications where a workpiece is thin, but sufficient hold pressure is needed to anchor drill bushing 124 to the workpiece.

Although specific embodiments were described herein, the scope is not limited to those specific embodiments. Rather, the scope is defined by the following claims and any equivalents thereof.

The invention claimed is:

1. A drill bushing comprising:
a base member having:
an upper surface;
a lower surface configured to rest on a workpiece having a pilot hole;
a side wall that extends between the upper surface and the lower surface; and
a retaining member that projects from the lower surface of the base member,
wherein the retaining member has a cylindrical outer diameter that fits within the pilot hole;
a drill hole that passes from the upper surface of the base member through the retaining member to provide a passage for a drill bit;
an expandable slit that extends from the upper surface to the lower surface of the base member and through the retaining member, and from the side wall of the base member through to the drill hole; and
an adjustment member configured to expand the expandable slit to increase the cylindrical outer diameter of the retaining member within the pilot hole.

2. The drill bushing of claim 1 wherein:
a cylindrical outer surface of the retaining member contacts a wall of the pilot hole when the adjustment member expands the expandable slit.

3. The drill bushing of claim 2 wherein:
the retaining member includes at least one surface feature that radially protrudes from the cylindrical outer surface of the retaining member.

4. The drill bushing of claim 1 wherein:
a length of the retaining member protruding from the lower surface of the base member is less than a thickness of the workpiece.

5. The drill bushing of claim 1 wherein:
the expandable slit defines opposing surfaces in the base member with a gap separating the opposing surfaces; and
the adjustment member includes:
a threaded hole that passes from the side wall of the base member to a first one of the opposing surfaces; and
a threaded rod that threads into the threaded hole, and having a first end that extends through the gap and contacts a second one of the opposing surfaces to expand the expandable slit.

6. The drill bushing of claim 5 wherein:
the threaded rod includes a handle on a second end that is distal from the first end; and
the handle is configured to be grasped by a human operator.

7. The drill bushing of claim 1 further comprising:
an attachment member on the upper surface of the base member to attach the base member to a drill unit.

8. The drill bushing of claim 7 wherein:
the attachment member includes at least one screw that attaches the base member to the drill unit.

9. A drill assembly comprising:
a drill bushing that includes:

a base member having an upper surface, a lower surface, a side wall that extends between the upper surface and the lower surface, and an annular retaining member that projects from the lower surface;
a drill hole that passes from the upper surface of the base member through the annular retaining member;
an expandable slit in the base member that extends from the side wall of the base member and through to the drill hole; and
an adjustment member configured to expand the expandable slit to increase an outer diameter of the annular retaining member.

10. The drill assembly of claim 9 wherein:
the annular retaining member is configured to be inserted into a pilot hole of a workpiece while the lower surface of the base member rests on a top surface of the workpiece; and
an outer surface of the annular retaining member contacts a wall of the pilot hole when the adjustment member expands the expandable slit.

11. The drill assembly of claim 10 wherein:
the annular retaining member includes at least one annular rib that radially protrudes from the outer surface of the annular retaining member.

12. The drill assembly of claim 10 wherein:
a length of the annular retaining member protruding from the lower surface of the base member is less than a thickness of the workpiece.

13. The drill assembly of claim 9 wherein:
the expandable slit defines opposing surfaces in the base member with a gap separating the opposing surfaces; and
the adjustment member includes:
a threaded hole that passes from the side wall of the base member to a first one of the opposing surfaces; and
a threaded rod that threads into the threaded hole, and having a first end that extends through the gap and contacts a second one of the opposing surfaces to expand the expandable slit.

14. The drill assembly of claim 13 wherein:
the threaded rod includes a handle on a second end that is distal from the first end; and
the handle is configured to be grasped by a human operator.

15. The drill assembly of claim 14 wherein:
the handle includes a scale that indicates how far the handle has been turned.

16. The drill assembly of claim 9 further comprising:
an attachment member on the upper surface of the base member to attach the base member to a drill unit.

17. A drill assembly comprising:
a drill unit; and
a drill bushing that attaches to an end of the drill unit, wherein the drill bushing includes:
a base member having an upper surface, a lower surface configured to contact a workpiece having a pilot hole, and an annular retaining member that projects from the lower surface of the base member and fits within the pilot hole;
a drill hole that passes from the upper surface of the base member through the annular retaining member to provide a passage for a drill bit of the drill unit; and
an attachment member on the upper surface of the base member to attach the base member to the drill unit;

wherein the drill bushing is split to form an expandable aperture that passes from the upper surface to the lower surface of the base member and through the annular retaining member, and from the drill hole to a periphery of the base member; and wherein the drill bushing further includes an adjustment member configured to expand the expandable aperture to increase an outer diameter of the annular retaining member within the pilot hole.

18. The drill assembly of claim 17 wherein:
the annular retaining member includes at least one surface feature that radially protrudes from an outer surface of the annular retaining member.

19. The drill assembly of claim 17 wherein:
a length of the annular retaining member protruding from the lower surface of the base member is less than a thickness of the workpiece.

20. The drill assembly of claim 17 wherein:
the expandable aperture defines opposing surfaces in the base member with a gap separating the opposing surfaces; and
the adjustment member includes:
  a threaded hole that passes from the periphery of the base member to a first one of the opposing surfaces; and
  a threaded rod that threads into the threaded hole, and having a first end that extends through the gap and contacts a second one of the opposing surfaces to expand the expandable aperture.

* * * * *